United States Patent
Hung et al.

(10) Patent No.: US 9,242,208 B2
(45) Date of Patent: Jan. 26, 2016

(54) REGENERATING-TYPE COMPRESSED AIR DRIER AND DEHUMIDIFICATING-AND-REGENERATING UNIT

(71) Applicant: INDUSTRIAL TECHNOLOGY RESEARCH INSTITUTE, Hsin-Chu (TW)

(72) Inventors: Ming-Lang Hung, Hsinchu (TW); Pen-Chang Tseng, Hsinchu (TW); Yu-Hao Kang, Hsinchu (TW); Hsing-Ting Chen, Hsinchu (TW); Jyi-Ching Perng, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 116 days.

(21) Appl. No.: 14/139,076

(22) Filed: Dec. 23, 2013

(65) Prior Publication Data
US 2015/0135958 A1 May 21, 2015

(30) Foreign Application Priority Data
Nov. 20, 2013 (TW) .............................. 102142220 A

(51) Int. Cl.
*B01D 53/26* (2006.01)

(52) U.S. Cl.
CPC .......... *B01D 53/261* (2013.01); *B01D 2257/80* (2013.01); *B01D 2259/40005* (2013.01); *B01D 2259/40096* (2013.01)

(58) Field of Classification Search
CPC .. B01D 53/04; B01D 53/261; B01D 2257/80; B01D 2259/40005; B01D 2259/40096
USPC ................... 96/121, 124, 126, 130, 146, 154; 137/80, 472, 473
See application file for complete search history.

(56) References Cited

U.S. PATENT DOCUMENTS

| 2,440,326 | A | * | 4/1948 | Cadman | ............................ 303/1 |
| 2,561,441 | A | * | 7/1951 | Wyan | ............................... 96/112 |

(Continued)

FOREIGN PATENT DOCUMENTS

| CN | 1938555 A | 3/2007 |
| CN | 101346589 A | 1/2009 |

(Continued)

OTHER PUBLICATIONS

Taiwan Patent Office, Office Action, Patent Application Serial No. TW102142220, Nov. 18, 2014, Taiwan.

(Continued)

*Primary Examiner* — Frank Lawrence
(74) *Attorney, Agent, or Firm* — Rabin & Berdo, P.C.

(57) ABSTRACT

A regenerating-type compressed air drier for regenerating compressed air by an electrical heating mechanism and a dehumidifying-and-regenerating unit are provided. The drier includes a dehumidifying-and-regenerating unit and an air distribution unit. Compressed high-humidity air and regenerating air are guided to the air distribution unit by a compressed high-humidity air piping and a regenerating air piping. The compressed high-humidity air and the regenerating air are guided to dehumidifying-and-regenerating components of the dehumidifying-and-regenerating unit by a shunt rotor of the air distribution unit to complete the dehumidification of the compressed air and the regeneration of the dehumidifying-and-regenerating components. The drier has a simple structure, and can reduce an undue loss of heat energy by an electrical heating mechanism to the regeneration of the dehumidifying-and-regenerating components.

19 Claims, 8 Drawing Sheets

(56) References Cited

U.S. PATENT DOCUMENTS

| | | | |
|---|---|---|---|
| 3,193,985 A * | 7/1965 | Siggelin | 95/125 |
| 3,505,783 A * | 4/1970 | Graham | 95/25 |
| 3,652,231 A | 3/1972 | Greenwood et al. | |
| 4,038,054 A * | 7/1977 | Graff | 96/124 |
| 4,601,114 A * | 7/1986 | Noguchi | 34/473 |
| 5,114,441 A * | 5/1992 | Kanner et al. | 95/98 |
| 5,534,186 A * | 7/1996 | Walker et al. | 252/194 |
| 5,584,322 A * | 12/1996 | Poschl et al. | 137/625.46 |
| 7,569,095 B2 | 8/2009 | Vanderstraeten et al. | |
| 7,854,794 B2 * | 12/2010 | Barone | 96/124 |
| 8,419,830 B2 * | 4/2013 | Masetto et al. | 95/148 |
| 2010/0077920 A1 * | 4/2010 | Baksh et al. | 95/97 |
| 2013/0145779 A1 | 6/2013 | Hwang | |

FOREIGN PATENT DOCUMENTS

| | | |
|---|---|---|
| CN | 102872688 A | 1/2013 |
| JP | 1969026272 | 11/1969 |
| JP | 49118621 | 11/1974 |
| JP | S59149142 A | 8/1984 |
| JP | S63162024 A | 7/1988 |
| JP | 1995021121 | 4/1995 |
| JP | H11221426 A | 8/1999 |
| JP | 2000213342 A | 8/2000 |
| JP | 2001-179037 A | 7/2001 |
| JP | 2002256830 A | 9/2002 |
| JP | 2005131544 A | 5/2005 |
| JP | 2005207638 A | 8/2005 |
| JP | 2005274181 A | 10/2005 |
| JP | 2007044254 A | 2/2007 |
| JP | 2008-542013 A | 11/2008 |
| JP | 2010207710 A | 9/2010 |
| JP | 2013059760 A | 4/2013 |
| TW | I255330 B | 5/2006 |
| TW | I347417 | 8/2006 |
| TW | M306314 U | 2/2007 |
| TW | M321979 U | 11/2007 |
| TW | M327979 U | 3/2008 |
| TW | M348921 U | 1/2009 |
| TW | M369437 U | 11/2009 |
| TW | 201026374 A | 7/2010 |
| TW | 201037239 A | 10/2010 |
| TW | 201102165 A | 1/2011 |
| TW | M416754 U | 11/2011 |
| TW | 201311336 A | 3/2013 |

OTHER PUBLICATIONS

A review of the mathematical models for predicting; T.S. GE, Y.Li, R.Z.Wang, Y; Renewable and Substainable Energy Reviews; 20070122; 12(2008).

Effectiveness of Energy Wheels from Transient meSuresments; O.O. Abe, C.J.Simonson, R.W. Besant, W.; International Journal of Heat and Mass Transfer; 20051013; 49(2006)52.

Kinetics of water Adsorption/desorption under isobaric stages of adsorption; L.S. Glaznev a, D.S. Ovoschnikov a,b, Yul. Aristov a, International Journal of Heat and Mass Transfer; 20080426; 52(2009).

Sorption properties for different types of molecular sieveand their influence on optimum dehumidification performance of desiccant wheels; Mihajlo N. Golubovic and William M. Worek; International Journal of Heat and Mass Transfer; 20040524; 49(2006).

Influence of elevated pressure on sorption; Mihajlo N. Golubovic and William M. Worek; Numerical Heat Transfer; 20040426; Part A, 45.

Heat transfer and friction coecients in corrugated ducts; J.L. Niu, L.Z. Zhang; International Journal of Heat and Mass Transfer; 20010429; 45(2002).

Japan Patent Office, Office Action issued on Oct. 2, 2015.
Japan Patent Office, Office Action issued on May 20, 2015.

* cited by examiner

REGENERATING-TYPE COMPRESSED AIR DRIER AND DEHUMIDIFICATING-AND-REGENERATING UNIT

CROSS-REFERENCE TO RELATED APPLICATIONS

This application claims priority to Taiwanese Patent Application No. 102142220, filed on Nov. 20, 2013. The entirety of the above-mentioned patent application is hereby incorporated by reference herein and made a part of this specification.

BACKGROUND

1. Technical Field

This disclosure relates to techniques for dehumidification and regeneration of compressed air, and, more particularly, to a regenerating-type compressed air drier.

2. Description of Related Art

With the rapid development of technology, compressed air is required to have improved quality, so as to ensure that the fabrication equipment has well enough availability. For example, the humidity of the compressed air is critical to the yield factor of a fabrication process. In recent years, researches are focused on the dehumidification of the compressed air.

An adsorption material that has dehumidification and regeneration capability is used to dehumidify the compressed air. The regeneration mechanism includes an indirect heating desorption method, a plasma desorption method, a microwave desorption method, and a low power consumption desorption method. The indirect heating method is performed in an air convention switching manner, which losses great heat. In the plasma desorption method, the regeneration process may be incomplete due to the varieties of the material characteristics, and an electric arc will be generated. The microwave desorption method employs microwaves to dehumidify the moisture of compressed air. However, the microwaves are easily to be blocked by a dehumidification structure and reduce the regeneration efficiency. In the low power consumption desorption method, water molecules are electrified to actuate the transitions of electrons. However, the low power consumption desorption method suffers from a low regeneration efficiency, because the adsorbent has poor conductivity and the currents generated are not evenly distributed. It is thus necessary to increase the power efficiency of the desorption regeneration.

A conventional drier may be designed in a variety of manners. A wheel-type drier comprises a dehumidification region, a regeneration region, and desiccant wheels that rotate cyclically between the dehumidification region and the regeneration region. High-humidity compressed air is guided into the dehumidification region for being dehumidified, and then the humidified compressed air is guided into an air storage barrel for storage. The desiccant wheels, once saturated, will rotate to the regeneration region, and processed in a desorption regeneration process by hot wind. The regenerated desiccant wheels will rotate to the dehumidification region again, ready for the next round of a dehumidification process. The wheel-type drier performs the dehumidification process and the regeneration process alternatively and continuously. The wheel-type drier employs a heater to generate heat needed to heat the regenerating air. However, this type of radiation and heat conduction suffers from a great energy loss and a low efficiency.

Another conventional drier comprises two adsorption towers and adsorbents filled in the adsorption towers. High-humidity compressed air is guided into one of the towers for the adsorbent therein to adsorb moisture contained in the compressed air. The humidified compressed air is guided into an air storage barrel for storage. At the same time, the adsorbent in the other of the towers is saturated with moisture, and the moisture can be desorbed from the adsorbent by heating the adsorbent. The heat can be transferred to the adsorbent by radiation or convention mechanism or a solid heat material. In this way, the adsorbent is regenerated, and is ready for adsorbing moisture of another high-humidity compressed air. However, this type of conventional drier, in which one of the adsorption tower is executing a dehumidification function, the other is executing a regeneration function, and heat is transferred to the adsorbent in a convention manner, consumes huge power. This type of conventional drier also needs a control valve to control the flowing mechanism of the compressed air, and therefore has a high manufacturing cost.

Therefore, how to provide a drier that consumes less power, performs better dehumidification efficiency, and has a lower manufacturing cost, is becoming an urgent issue in the art.

SUMMARY OF THE DISCLOSURE

The present disclosure provides a regenerating-type compressed air drier, comprising: a dehumidifying-and-regenerating unit comprising a first dehumidifying-and-regenerating component and a second dehumidifying-and-regenerating component and alternatively executing dehumidifying and regenerating functions of the first and second dehumidifying-and-regenerating components; a compressed high-humidity air piping for conducting compressed high-humidity air; a regenerating air piping for receiving regenerating air; a first pipeline set connected to the first dehumidifying-and-regenerating component and comprising a first dehumidification pipeline and a first regeneration pipeline; a second pipeline set connected to the second dehumidifying-and-regenerating component and having a second dehumidification pipeline and a second regeneration pipeline; and an air distribution unit having a shunt rotor that guides the compressed high-humidity air and the regenerating air to the first dehumidification pipeline and the second regeneration pipeline, respectively, or guides the compressed high-humidity air and the regenerating air to the second dehumidification pipeline and the first regeneration pipeline, respectively, wherein the first dehumidification pipeline and the second dehumidification pipeline input the compressed high-humidity air to the dehumidifying-and-regenerating unit to perform the dehumidification function, and the first regeneration pipeline and the second regeneration pipeline input the regenerating air to the dehumidifying-and-regenerating unit to perform the regeneration function.

In an embodiment, each of the first and second dehumidifying-and-regenerating components forms an air passage having at least one chamber, and a dehumidification module disposed in the chamber, the dehumidification module having an adsorption material that adsorbs moisture of the compressed high-humidity air and desorbs the moisture when saturated, and an electric heating component that has a screw unit as an electrode connector and a conductive board, the screw unit being connectible to a power supply that supplies power to the adsorption material and enables the adsorption material to generate heat and desorbs the moisture. Further, the adsorption material has a U-shape, a plurality of folded portions, and a plurality of interval boards disposed within the folded portions.

In another embodiment, the shunt rotor a front guiding groove and a rear guiding groove that guide the compressed high-humidity air and the regenerating air to corresponding dehumidification pipelines or regeneration pipelines.

The present disclosure further provides a dehumidifying-and-regenerating unit, comprising: an inlet cover; an outlet cover; two dehumidifying-and-regenerating components, each of which has two end surfaces fixed to and sealed with the inlet cover and the outlet cover, respectively; a partition board that partitions the inlet cover, the outlet cover and the two dehumidifying-and-regenerating components into two air passages; two chambers formed in the dehumidifying-and-regenerating components, respectively; and two dehumidification modules disposed in the chambers, respectively.

The present disclosure provides another drier, comprising a dehumidifying-and-regenerating unit having two dehumidifying-and-regenerating components and alternatively executing dehumidifying and regenerating functions of the dehumidifying-and-regenerating components; and an air distribution unit having a shunt rotor that guides compressed high-humidity air and regenerating air via at least two pipeline sets to the dehumidifying-and-regenerating components, respectively, and alternatively executing the dehumidifying and regenerating functions.

Compared with the prior art, the driers according to the present disclosure can execute a dehumidification function on compressed air and a regeneration function on an adsorption material therein, so as to overcome the drawbacks in the prior art that the heating power will be lost easily and cannot be used efficiently. Unlike the prior art, which switches executing dehumidifying and regenerating functions in a rotary manner, the present disclosure further provides an air distribution unit that guides compressed high-humidity air and regenerating air, and uses a shunt rotor of the air distribution unit to distribute air. Therefore, the driers according to the present disclosure do not need a control valve to control the rotary manner, and has a low equipment cost.

BRIEF DESCRIPTION OF DRAWINGS

The disclosure can be more fully understood by reading the following detailed description of the preferred embodiments, with reference made to the accompanying drawings, wherein.

DETAILED DESCRIPTION OF THE DISCLOSURE

Figure 1:
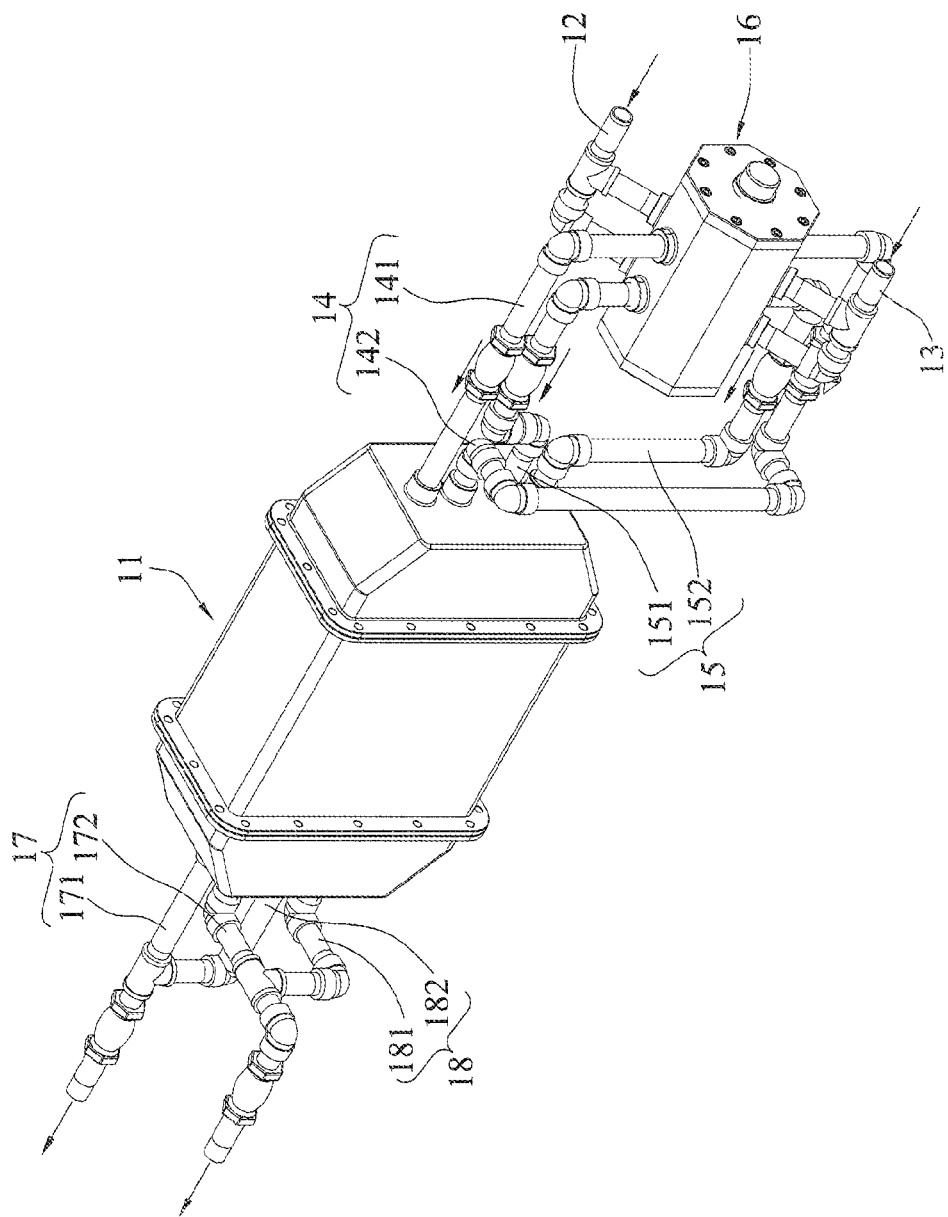
FIG. 1 is a schematic diagram of a regenerating-type compressed air drier according to the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic diagram of a regenerating-type compressed air drier for generating compressed air by an electric heating mechanism according to the present disclosure. As shown in FIG. 1, two dehumidifying-and-regenerating components are illustrated to adsorb and dehumidify the moisture in compressed air and to desorb the moisture. In operation, one of the dehumidifying-and-regenerating components executes a dehumidification function, and the other executes a regeneration function. Therefore, the drier according to the present disclosure has a simple structure and a low manufacturing cost.

An electric heating mechanism is employed in the present disclosure. A dehumidification module that has the electric heating mechanism comprises a heating metal carrier, such as iron, chromium and aluminum, as an intermediate structure, a temperature-resistant film adhered to one side of the heating metal carrier, and an adsorption material adhered to the other side of the heating metal carrier. Then, two such dehumidification modules are adhered in a manner that the two temperature-resistant films are adhered, to form a composite dehumidification module that has the adsorption materials adhered to both sides thereof.

As shown in FIG. 1, a drier 1 for generating compressed air by an electric heating mechanism comprises: a dehumidifying-and-regenerating unit 11, a compressed high-humidity air piping 12, a regenerating air piping 13, a first pipeline set 14, a second pipeline set 15 and an air distribution unit 16.

The dehumidifying-and-regenerating unit 11 is in communication with the air distribution unit 16 via the first pipeline set 14 and the second pipeline set 15, and executes dehumidifying and regenerating functions to exhaust the dehumidified and regenerated air for stored or congealed by a device subsequently.

The dehumidifying-and-regenerating unit 11 comprises a first dehumidifying-and-regenerating component and a second dehumidifying-and-regenerating component, and alternatively executes dehumidifying and regenerating functions of the first and second dehumidifying-and-regenerating components. In other words, when the first dehumidifying-and-regenerating component is executing the dehumidification function, the second dehumidifying-and-regenerating component is executing the regeneration function. After the first and second dehumidifying-and-regenerating components complete the dehumidifying and regenerating functions, respectively, dehumidifying-and-regenerating the air distribution unit 16 switches the type of air received, and the first and second dehumidifying-and-regenerating components are changed to execute the regeneration and dehumidification functions, respectively. In an embodiment, air processed when the first and second dehumidifying-and-regenerating components perform the regeneration process is under an atmospheric-pressure or in a compressed state.

The compressed high-humidity air piping 12 conducts compressed high-humidity air. The regenerating air piping 13 receives regenerating air. After entering the air distribution unit 16, the compressed high-humidity air and the regenerating air are guided internally and output from appropriate exhaust pipes.

For example, the first and second dehumidifying-and-regenerating components are disposed on upper and lower positions of the dehumidifying-and-regenerating unit 11, respectively, as shown in FIG. 1. The first pipeline set 14 is connected to the first dehumidification regeneration component (disposed on the upper position), and comprises a first dehumidification pipeline 141 and a first regeneration pipeline 142. The second pipeline set 15 is connected to the second dehumidifying-and-regenerating component, and comprises a second dehumidification pipeline 151 and a second regeneration pipeline 152.

The air distribution unit 16 comprises a shunt rotor (not shown in FIG. 1, detailed in the following paragraphs). The shunt rotor guides the compressed high-humidity air and the regenerating air to the first dehumidification pipeline 141 and the second regeneration pipe 152, respectively, or guides the compressed high-humidity air and the regenerating air to the second dehumidification pipeline 151 and the first regeneration pipeline 142, respectively. In other words, the compressed high-humidity air and the regenerating air, after distributed by the shunt rotor of the air distribution unit 16, are transferred to the first d dehumidifying-and-regenerating component that is executing the dehumidification function and to the second dehumidifying-and-regenerating component that is executing the regeneration function, respectively.

The drier 1 further comprises a third pipeline set 17 connected to the first dehumidifying-and-regenerating component and a fourth pipeline set 18 connected to the second dehumidifying-and-regenerating component. The third pipeline set 17 comprises a first dehumidification exhaust pipe 171 and a first regeneration exhaust pipe 172. The fourth pipeline set 18 comprises a second regeneration exhaust pipe 181 and a second dehumidification exhaust pipe 182. Therefore, the dehumidified and regenerated air can be exhausted, for use by other devices subsequently.

Figure 2:
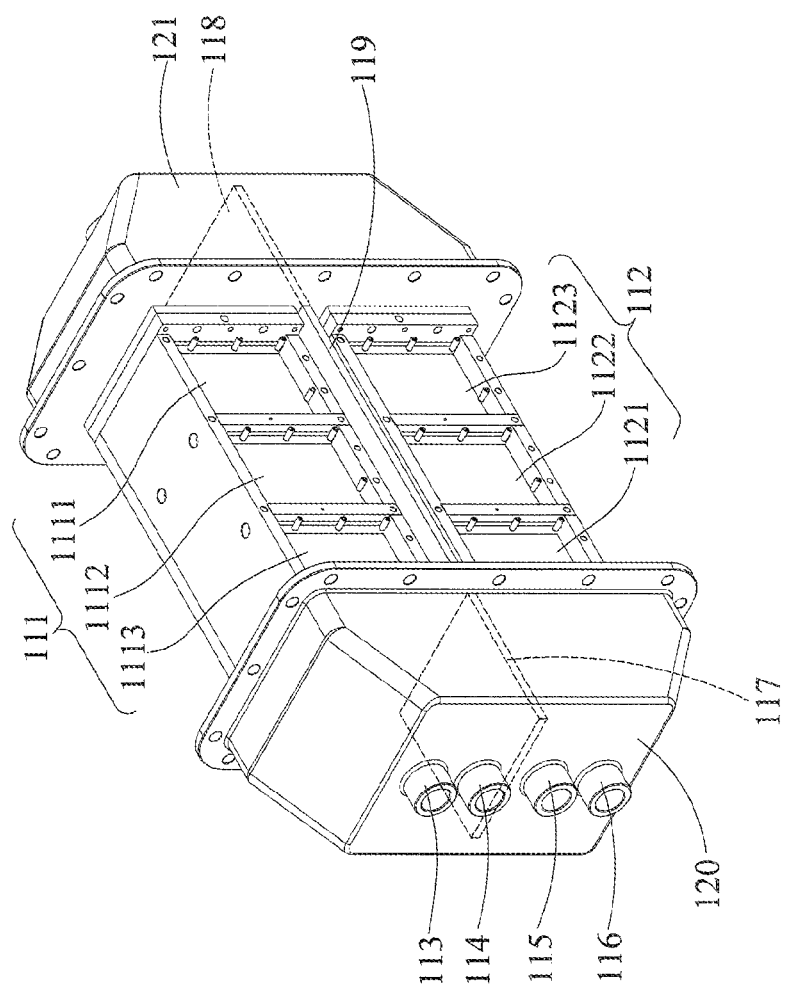
FIG. 2 is a schematic diagram of a dehumidifying-and-regenerating unit of a drier according to the present disclosure.

FIG. 2 is a schematic diagram of the dehumidifying-and-regenerating unit 11 of the drier 1 according to the present disclosure. The dehumidifying-and-regenerating unit 11 comprises a first dehumidifying-and-regenerating component 111 and a second dehumidifying-and-regenerating component 112, each of which forms air passages, adjacent two of which have at least a chamber. As shown in FIG. 2, the first dehumidifying-and-regenerating components 111 has three chambers, and the second dehumidifying-and-regenerating component 112 also has three chambers. The first dehumidifying-and-regenerating component 111 has dehumidification modules 1111, 1112 and 1113 disposed in the three chambers, respectively. The second dehumidifying-and-regenerating component 112 also has three dehumidification modules 1121, 1122 and 1123 disposed in the three chambers, respectively.

The dehumidifying-and-regenerating 11 has a first interface 113, a second interface 114, a third interface 115 and a fourth interface 116 near an air entering end (near the air distribution unit 16). The first interface 113 and the second interface 114 are connectible to the first dehumidification pipeline 141 and the first regeneration pipeline 142 of the first pipeline set 14 shown in FIG. 1. The third interface 115 and the fourth interface 116 are connectible to the second dehumidification pipeline 151 and the second regeneration pipeline 152 of the second pipeline set 15 shown in FIG. 1. Therefore, appropriate air (e.g., compressed high-humidity air or regenerating air) can be provided according to the dehumidification function or regeneration function executed by the dehumidifying-and-regenerating component 111 and the dehumidifying-and-regenerating component 112, to perform various reactions, such as dehumidification drying and regeneration reduction.

The dehumidifying-and-regenerating unit 11 has the first dehumidifying-and-regenerating component 111 and the second dehumidifying-and-regenerating component 112, to dehumidify the compressed air and regenerate the adsorption material. The first dehumidifying-and-regenerating component 111 and the second dehumidification regeneration component 112 have an inlet cover 120 and an outlet cover 121 on both ends thereof, and are partitioned by a partition board 119, to become two air passages that individually and independently execute the dehumidifying and regenerating functions. The first interface 113, the second interface 114, the third interface 115 and the fourth interface 116 are disposed on the inlet cover 120. The inlet cover 120 is partitioned into two spaces by a partition board 117 on one end of the partition board 119. A partition board 118 on the other end of the partition board 119 partitions the outlet cover 121 into two spaces. The partition board 118 and the partition board 117 pertain to a whole piece of partition board, i.e., the partition board 119. The partition board 119 is disposed between the first dehumidifying-and-regenerating component 111 and the second dehumidifying-and-regenerating component 112. The inlet cover 120 and the outlet cover 121 are fixed to and sealed with two ends of the first dehumidifying-and-regenerating component 111 and the second dehumidifying-and-regenerating component 112 such that the two air passages are formed, in which two air guiding processes are performed independently. Therefore, the first dehumidifying-and-regenerating component 111 and the second dehumidifying-and-regenerating component 112 guide the dried, compressed air into an air storage barrel for storage and subsequent uses, and guide the hot high-humidity air into a subsequent processing device for condensed and exhausted.

The dehumidifying-and-regenerating unit 11 also has four pipelines, i.e., four pipeline interfaces, near an air exhausting end, and the pipeline interfaces are connected to the outlet cover 121 for outputting air processed by the first dehumidifying-and-regenerating component 111 and the second dehumidifying-and-regenerating component 112.

Please refer to FIGS. 1 and 2, the compressed high-humidity air and the regenerating air transferred by the compressed high-humidity air piping 12 and the regenerating air piping 13, after entering the air distribution unit 16, will be guided. In an embodiment, the first dehumidifying-and-regenerating component 111 connected to the first dehumidification pipeline 141 and the first regeneration pipeline 142 executes the dehumidification function, and the compressed high-humidity air enters the dehumidifying-and-regenerating unit 11 via the first dehumidification pipeline 141. At the same time, the second dehumidifying-and-regenerating component 112 connected to the second dehumidification pipeline 151 and the second regeneration pipeline 152 executes the regeneration function, and the regenerating air enters the dehumidifying-and-regenerating unit 11 via the second regeneration pipeline 152.

Alternatively, if the first dehumidification regeneration component 111 connected to the first dehumidification pipeline 141 and the first regeneration pipeline 142 executes the regeneration function and the compressed high-humidity air enters the dehumidifying-and-regenerating unit 11 via the first regeneration pipeline 142, the dehumidifying-and-regenerating components 112 connected to the second dehumidification pipeline 151 and the second regeneration pipeline 152 will execute the dehumidification function and the regenerating air enters the dehumidifying-and-regenerating unit 11 via the second dehumidification pipe 151. Therefore, the high-temperature high-humidity air and reduction air, after guided by the air distribution unit 16, will be transferred to appropriate dehumidifying-and-regenerating components. For example, one of the dehumidifying-and-regenerating components of the dehumidifying-and-regenerating unit, after executing the dehumidification function, can provide reduction air and regenerate the adsorption material. On the other hand, the other one of the dehumidifying-and-regenerating components, after executing the regeneration function, can dehumidify the compressed high-humidity air. In this manner, the two dehumidifying-and-regenerating components can execute the dehumidifying and regenerating functions respectively and alternatively.

Figure 3:
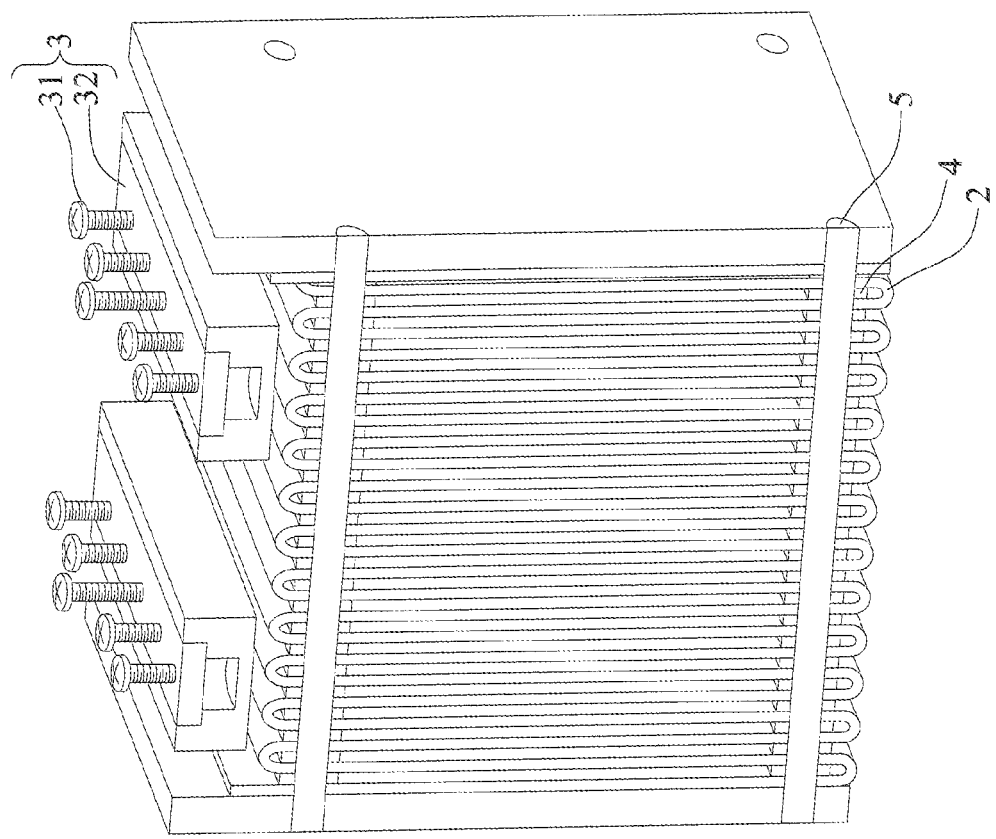
FIG. 3 is a cross-sectional view of a dehumidification module of a drier according to the present disclosure.

FIG. 3 is a cross sectional view of a dehumidification module of a drier according to the present disclosure. The internal structure of the dehumidification module 1111 (and the other dehumidification modules) shown in FIG. 2 will be further described. In the dehumidification modules 1111, 1112 and 1113, the chamber is composed of a chamber bottom board, a chamber top board and a chamber side board, and forms an air passage with the inlet cover 120, the outlet cover 121 and the partition board 119, for covering the adsorption material 2, which is used to adsorb the moisture of the compressed high-humidity air and desorb the moisture after saturated. The dehumidification modules 1111, 1112 and 1113 may have a plurality of chambers that are partitioned by partition boards. The partition boards have through holes, via which the dehumidification modules disposed in the chambers communicate with one another, to execute the dehumidification function for the compressed air and regenerate the adsorption material.

The dehumidification module 1111 further comprises an electric heating component 3. The electric heating component 3 comprises a screw unit 31 as an electrode connector and a conductive board 32. The screw unit 31 is connectible to a power supply, and the power supply supplies power to enable the adsorption material to generate heat and desorb the moisture. A temperature-tolerant foam can be filled among the chamber bottom, the chamber side board and the adsorption material 2, to improve air-tightness and prevent from leakage of the processed compressed air. Preferably, a filter can be disposed on the air entering and exhausting ends, to prevent dust or foreign matter from entering the dehumidification module 1111. An oil-seal groove can be further formed to improve the air-tightness of the dehumidification module 1111. The conductive board 32 in the dehumidification module 1111 is fixed to a top cover of the dehumidification module 1111. The screw unit 31 is exposed from the top cover to form an electrode connector for a power supply to be connected therewith and supply power to the dehumidification module 1111 to enable the dehumidification module 1111 to generate and execute the regeneration function.

In order to improve the moisture adsorbing capability of the adsorption material 2, the adsorption material 2 has a U-shape and a plurality of folded portions. Through holes are formed on the adsorption material 2 and interval boards 4, and a spacer bar 5 passes through the through holes to fix the adsorption material 2 to the interval boards 4. The interval boards 4 are disposed within the folded portions to partition the adsorption material 2, allowing the compressed air to flow in the ducts smoothly, to improve the adsorption efficiency and reduce the loss of the elements. Preferably, a gap between two adsorption materials 2 is 1-10 mm.

Figure 4:
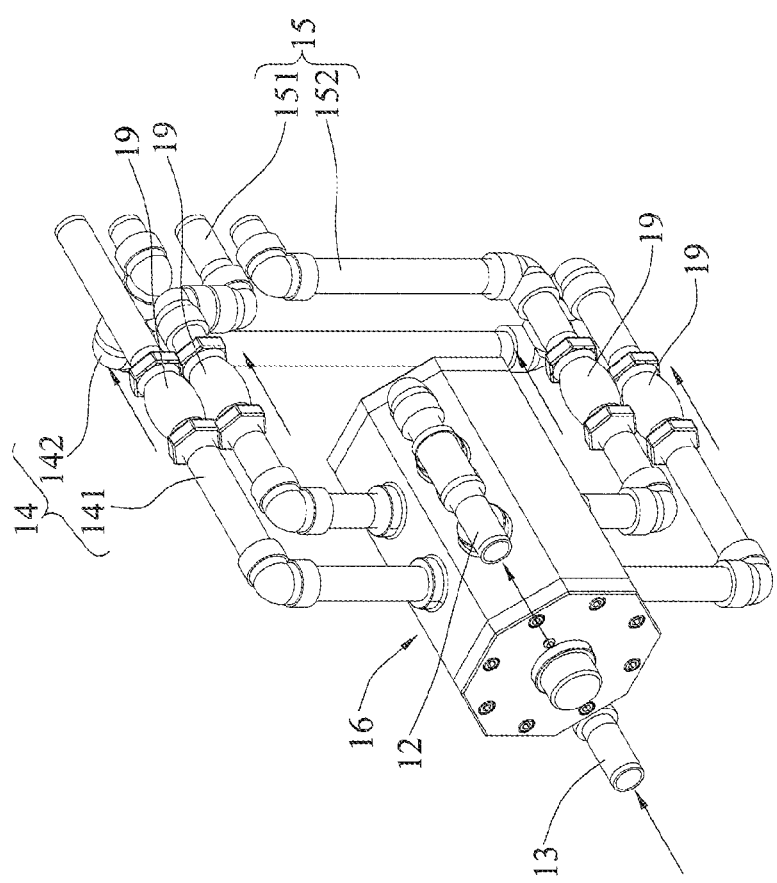
FIG. 4 is a schematic diagram of air receiving pipes of a drier according to the present disclosure.

FIG. 4 is a schematic diagram of air receiving pipes of a drier according to the present disclosure. The above-described structures are communicated with one another via the first pipeline set 14, the second pipeline set 15 and the air distribution unit 16. The compressed high-humidity air piping 12 guides the compressed high-humidity air generated by a compressor into the air distribution unit 16, and the regenerating air piping 13 guides air for generation into the air distribution unit 16. The first pipeline set 14 comprises a first dehumidification pipeline 141 and a first regeneration pipeline 142. The second pipeline set 15 comprises a second dehumidification pipeline 151 and a second regeneration pipeline 152. The air distribution unit 16 distributes the compressed high-humidity air ready to be dehumidified and air ready to be regenerated to appropriate dehumidifying-and-regenerating components (FIG. 1).

Each of the first dehumidification pipeline 141, the first regeneration pipeline 142, the second dehumidification pipeline 151 and the second regeneration pipeline 152 has a check valve 19, for preventing the compressed air in the duct from flowing reversely. Similarly, the third pipeline set 17 and the fourth pipeline set 18, which are used for exhausting air, also have a check valve, for preventing the compressed air in the duct from flowing reversely.

Figure 5A:
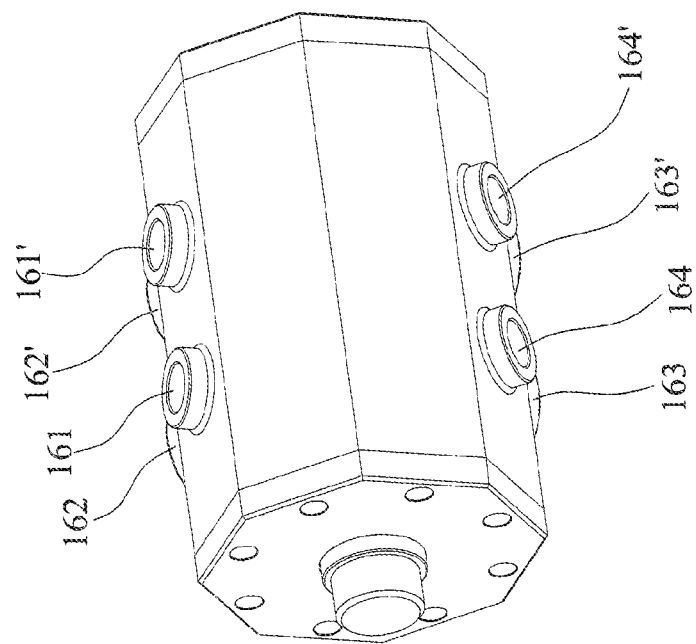
FIGS. 5A and 5B are schematic diagrams of an air distribution unit of a drier according to the present disclosure.
Figure 5B:
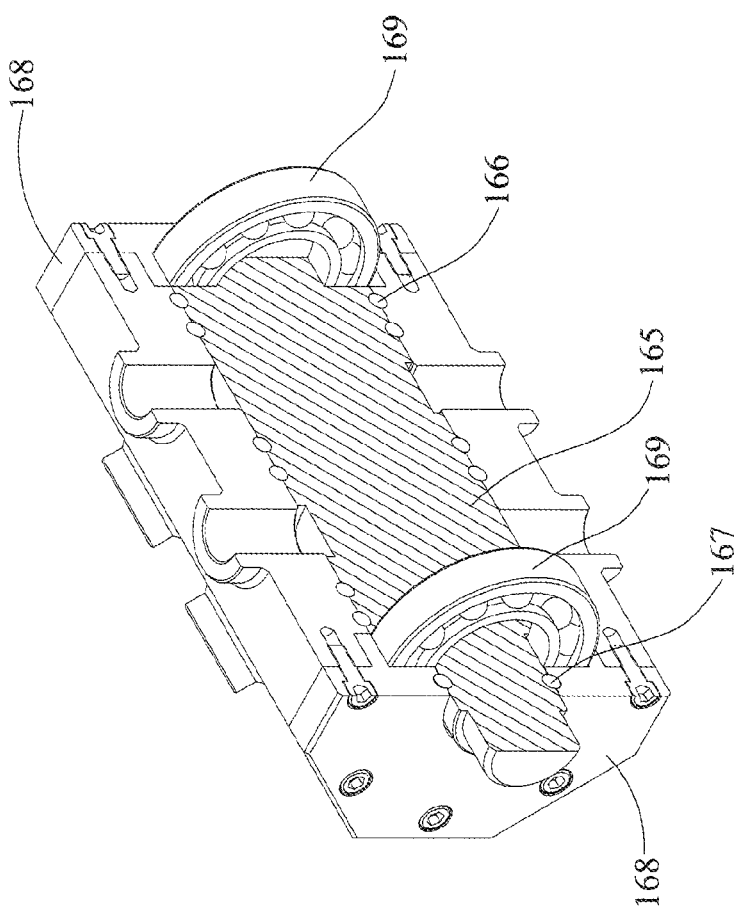

FIGS. 5A and 5B are schematic diagrams of an air distribution unit of a drier according to the present disclosure. As shown in FIG. 5A, the air distribution unit 16 further comprises two compressed high-humidity air inlets 161 and 161' and two dehumidification air outlets 162 and 162'. The compressed high-humidity air inlets 161 and 161' are in communication with the compressed high-humidity air piping 12 (FIG. 1), and the dehumidification air outlets 162 and 162' are in communication with the first dehumidification pipeline 141 and the second dehumidification pipeline 151 (FIG. 1).

The compressed high-humidity air inlets 161 and 161' are disposed at an appropriate region of the air distribution unit 16 and are in communication with the compressed high-humidity air piping 12. The compressed high-humidity air generated by the compressor is guided into the air distribution unit 16, and output from the dehumidification air outlets 162 and 162'. The dehumidification air outlets 162 and 162' are in communication with the first dehumidification pipeline 141 and the second dehumidification pipeline 151, respectively, for guiding the compressed high-humidity air into the dehumidifying-and-regenerating component of the dehumidifying-and-regenerating unit 11 that executes the dehumidification function, to dehumidify the compressed high-humidity air.

Two regenerating air inlets 163 and 163' are disposed in an appropriate region of the air distribution unit 16. The regenerating air inlets 163 and 163' are in communication with the regenerating air piping 13. Guided into the air distribution unit 16, the regenerating air is guided by the air distribution unit 16, and output from the regenerating air outlets 164 and 164'. The regenerating air outlets 164 and 164' are in communication with the first regeneration pipeline 142 and the second regeneration pipeline 152. After guided by the air distribution unit 16, the regenerating air is transferred by the first regeneration pipeline 142 or the second regeneration pipeline 152, and guided into the dehumidifying-and-regenerating component of the dehumidifying-and-regenerating unit 11 that executes the regeneration function, for the adsorption material to desorb the moisture.

As shown in FIG. 5B, the air distribution unit 16 comprises a shunt rotor 165. The air distribution unit 16 has two air-tight end boards 168 on two ends thereof, respectively, for preventing the leakage of the air in the chamber of the air distribution unit 16. The chamber comprises the shunt rotor 165 for distributing the compressed high-humidity air and the regenerating air into appropriate pipes in the device, for corresponding functions to be executed thereon.

Two bearings 169 can be disposed on two ends of the shunt rotor 165, respectively, and rotate in the chamber of the air distribution unit 16 to distribute air. An oil seal set 166 prevents air from freely flowing among the chambers. Am oil seal strip 167 prevents the air in the chamber of the air distribution unit 16 from flowing to a region outside of the body.

Figure 6:
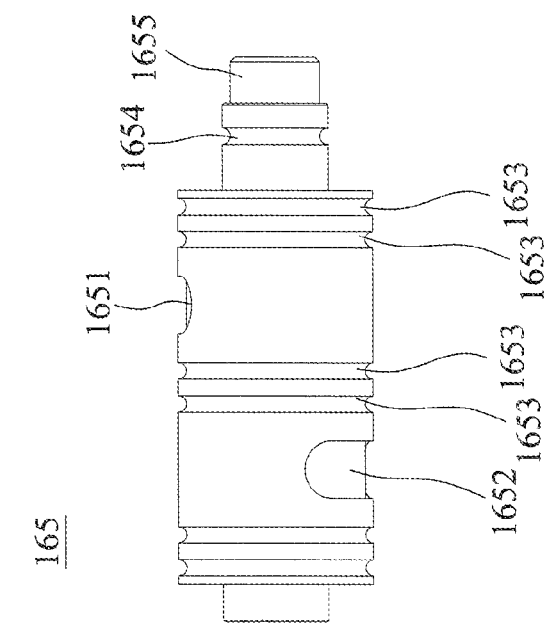
FIG. 6 is a schematic diagram of a shunt rotor of a drier according to the present disclosure.
Figure 6:
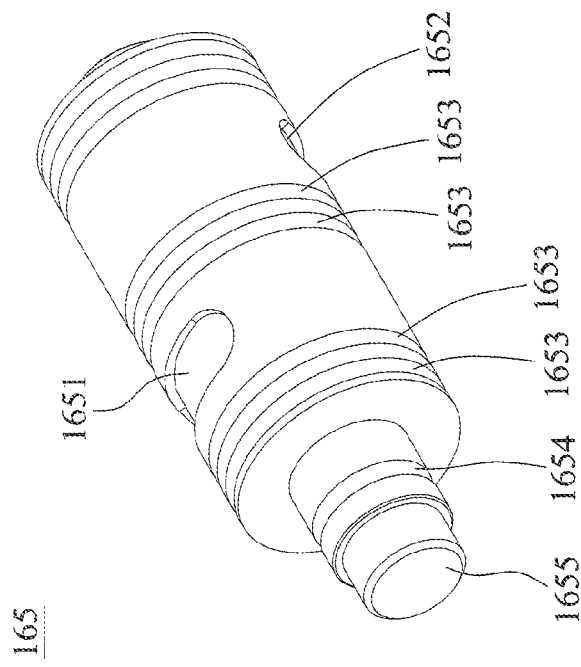

FIG. 6 is a schematic diagram of a shunt rotor of a drier according to the present disclosure. As shown in FIG. 6, the shunt rotor 165 comprises a front guiding groove 1651 and a rear guiding groove 1652, for guiding the compressed high-humidity air and the regenerating air to the corresponding dehumidification pipeline or regeneration pipeline. The front guiding groove 1651 and the rear guiding groove 1652 have a length or angle that is adjustable according to the ratio of time lengths that the dehumidification function and the regeneration function are executed. The shunt rotor 165 has an inner oil-sealed air-tight grooved tank 1653 left on a body thereof, for the oil seal set 166 to be disposed thereon, for preventing air from flowing among the chambers. An outer oil-sealed air-tight grooved tank 1654 is provided for an oil seal strip 167 to be disposed thereon, for preventing the air in the chamber from flowing to a region outside of the body.

The shunt rotor 165 further comprises a transmission shaft 1655 that is connectible with a motor and other transmission mechanism. The transmission shaft 1655 can drive the body of the shunt rotor to rotate by connecting itself with a motor or other corresponding transmission mechanism. The principle that the front guiding groove 1651 and the rear guiding groove 1652 are in communication with pipes is described in the following paragraphs.

Figure 7B:
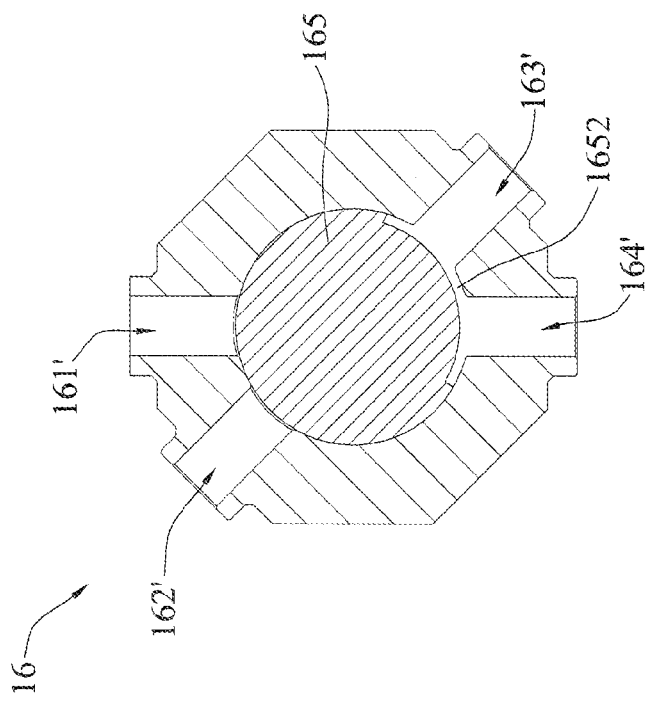
FIGS. 7A and 7B illustrate the operation of a shunt rotor of a drier according to the present disclosure.
Figure 7A:
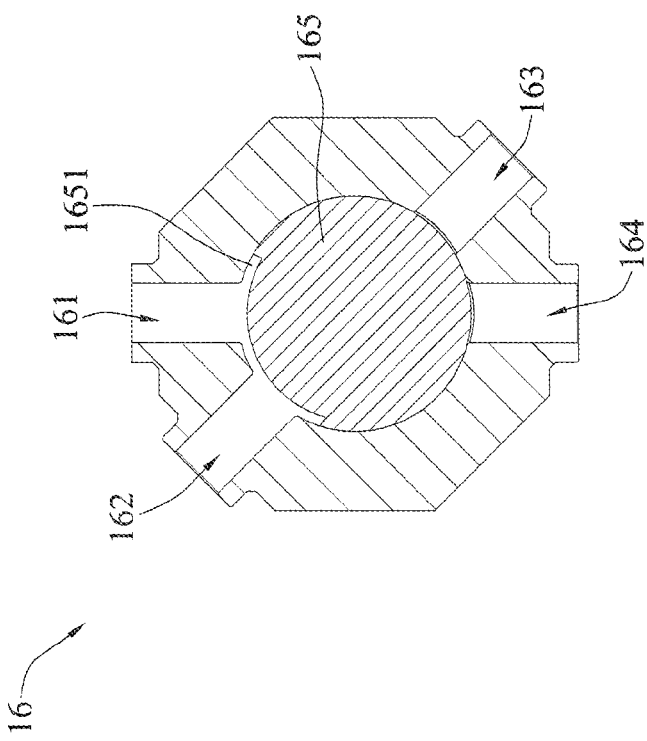

FIGS. 7A and 7B illustrate the operation of a shunt rotor of a drier according to the present disclosure. FIG. 7A illustrates the dehumidification operation. FIG. 7b illustrates the regeneration operation.

As shown in FIG. 7A, after entering the air distribution unit 16 via the compressed high-humidity air inlet 161, the compressed high-humidity air will flow along the front guiding groove 1651 on the shunt rotor 165, and be output from the dehumidification air outlet 162 to a region outside of the air distribution unit 16, and transferred via the first dehumidification pipeline 141 to the dehumidifying-and-regenerating component that executes the dehumidification function. At the same time, no air is allowed to be transferred between the regenerating air inlet 163 and the regenerating air outlet 164.

As shown in FIG. 7B, after entering the air distribution unit 16 via the regenerating air inlet 163', the regenerating air will flow along the rear guiding groove 1652 on the shunt rotor 165, and be output via the regenerating air outlet 164' to a region outside of the air distribution unit 16, and transferred via the second regeneration pipeline 152 to the dehumidifying-and-regenerating component that executes the regeneration function. At the same time, no air is allowed to be transferred between the compressed high-humidity air inlet 161' and the dehumidification air outlet 162'.

Through the rotation of the shunt rotor 165, different air conveying ducts are conducted due to the different positions of the front guiding groove 1651 and the rear guiding groove 1652. Therefore, the dehumidification function and the regeneration function can be executed alternatively, to achieve the objective of continuous operation. Through the adjustment of the length or angle of the front guiding groove 1651 and the rear guiding groove 1652 on the shunt rotor 165, the time when the air enters the dehumidification region and the regeneration region can be controlled. The shunt rotor 165 can also the time when the air enters the dehumidification region and the regeneration region by changing its rotation speed, so as to adjust the operation time needed for the dehumidification region and the regeneration region.

Compared with the prior art, the driers according to the present disclosure can execute a dehumidification function on compressed air and a regeneration function on an adsorption material therein, so as to overcome the drawbacks in the prior art that the heating power will be lost easily and cannot be used efficiently. Unlike the prior art, which switches executing dehumidifying and regenerating functions in a rotary manner, the present disclosure further provides an air distribution unit that guides compressed high-humidity air and regenerating air, and uses a shunt rotor of the air distribution unit to distribute air. Therefore, the driers according to the present disclosure do not need a control valve to control the rotary manner, and has a low equipment cost.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A regenerating-type compressed air drier, comprising:
   a dehumidifying-and-regenerating unit comprising a first dehumidifying-and-regenerating component and a second dehumidifying-and-regenerating component for alternatively executing dehumidifying and regenerating functions of the first and second dehumidifying-and-regenerating components;
   a compressed high-humidity air piping for conducting compressed high-humidity air;
   a regenerating air piping for conducting regenerating air;
   a first pipeline set being connected to the first dehumidifying-and-regenerating component and comprising a first dehumidifying pipeline and a first regenerating pipeline;
   a second pipeline set being connected to the second dehumidifying-and-regenerating component and comprising a second dehumidifying pipeline and a second regenerating pipeline; and
   an air distribution unit having a shunt rotor that guides the compressed high-humidity air and the regenerating air to the first dehumidifying pipeline and the second regenerating pipeline, respectively, or guides the compressed high-humidity air and the regenerating air to the second dehumidifying pipeline and the first regenerating pipeline respectively,
   wherein the first dehumidifying pipeline and the second dehumidifying pipeline conduct the compressed high-humidity air to the dehumidifying-and-regenerating unit to perform the dehumidifying function, and the first regenerating pipeline and the second regenerating pipeline conduct the regenerating air to the dehumidifying-and-regenerating unit to perform the regenerating function.

2. The regenerating-type compressed air drier of claim 1, wherein each of the first and second the dehumidifying-and-regenerating components comprises at least one chamber and a dehumidification module disposed in the at least one chamber, and the dehumidification module comprises:
   an adsorption material that adsorbs moisture of the compressed high-humidity air and desorbs the moisture after saturated; and
   an electric heating component comprising a screw unit as an electrode connector and a conductive board, wherein the screw unit is connectible to a power supply that supplies power to the adsorption material and enables the adsorption material to generate heat and desorbs the moisture.

3. The regenerating-type compressed air drier of claim 2, wherein the adsorption material has a U-shape, a plurality of folded portions, and a plurality of interval boards disposed within the folded portions.

4. The regenerating-type compressed air drier of claim 1, further comprising:
a third pipeline set connected to the first dehumidifying-and-regenerating component and having a first dehumidification exhaust pipe and a first regeneration exhaust pipe; and
a fourth pipeline set connected to the second dehumidifying-and-regenerating component and having a second dehumidification exhaust pipe and a second regeneration exhaust pipe.

5. The regenerating-type compressed air drier of claim 4, wherein each of the third pipeline set and the fourth pipeline set has a check valve.

6. The regenerating-type compressed air drier of claim 1, wherein the air distribution unit further comprises two compressed high-humidity air inlets in communication with the compressed high-humidity air piping, and two dehumidification air outlets in communication with the first dehumidification pipeline and the second dehumidification pipeline, respectively.

7. The regenerating-type compressed air drier of claim 1, wherein the air distribution unit further comprises two regenerating air inlets in communication with the regenerating air piping and two regenerating air outlets in communication with the first regeneration pipe and the second regeneration pipe, respectively.

8. The regenerating-type compressed air drier of claim 1, wherein the shunt rotor comprises a front guiding groove and a rear guiding groove that guide the compressed high-humidity air and the regenerating air to corresponding dehumidification pipes or regeneration pipes.

9. The regenerating-type compressed air drier of claim 8, wherein the shunt rotor further comprises a transmission shaft connectible to a motor or a transmission mechanism.

10. The regenerating-type compressed air drier of claim 1, wherein each of the first dehumidification pipeline, the first regeneration pipeline, the second dehumidification pipeline and the second regeneration pipeline has a check valve.

11. The regenerating-type compressed air drier of claim 1, wherein air processed when the first and second dehumidifying-and-regenerating components perform the regeneration process is under an atmospheric-pressure or in a compressed state.

12. The regenerating-type compressed air drier of claim 1, wherein the dehumidification regeneration unit further comprises an inlet cover and an outlet cover.

13. The regenerating-type compressed air drier of claim 12, further comprising a partition board disposed between the inlet cover and the outlet cover and between the first dehumidifying-and-regenerating component and the second dehumidifying-and-regenerating component.

14. The regenerating-type compressed air drier of claim 13, wherein the inlet cover, the outlet cover, the first dehumidifying-and-regenerating component, the second dehumidifying-and-regenerating component and the partition board form an air passage.

15. The regenerating-type compressed air drier of claim 1, wherein the air distribution unit further comprises an air-tight end board.

16. A dehumidifying-and-regenerating unit, comprising:
an inlet cover;
an outlet cover;
two dehumidifying-and-regenerating components, each of which has two end surfaces fixed to and sealed with the inlet cover and the outlet cover respectively;
a partition board that partitions the inlet cover, the outlet cover and the two dehumidifying-and-regenerating components into two air passages;
two chambers formed in the dehumidifying-and-regenerating components respectively; and
two dehumidification modules disposed in the chambers respectively.

17. The dehumidifying-and-regenerating unit of claim 16, wherein each of the dehumidification modules comprises:
an adsorption material that adsorbs moisture of compressed high-humidity air and desorbs the moisture after saturated; and
an electric heating component comprising a screw unit as an electrode connector and a conductive board, wherein the screw unit is connectible to a power supply that supplies power to the adsorption material and enables the adsorption material to generate heat and desorbs the moisture.

18. The dehumidifying-and-regenerating unit of claim 17, wherein the adsorption material has a U-shape, a plurality of folded portions, and a plurality of interval boards disposed within the folded portions.

19. The dehumidifying-and-regenerating unit of claim 16, wherein the inlet cover and the outlet cover have interfaces for a dehumidification pipeline and a regeneration pipeline to be interfaced with, respectively.

\* \* \* \* \*